(12) United States Patent
Han et al.

(10) Patent No.: US 8,302,433 B2
(45) Date of Patent: Nov. 6, 2012

(54) DAMPER, WASHING MACHINE WITH THE SAME AND CONTROL METHOD THEREOF

(75) Inventors: Jeong Su Han, Suwon-si (KR); Ho Yoon, Yongin-si (KR); Jung Hyeon Kim, Hwaseong-si (KR); Hyen Young Choi, Suwon-si (KR); Sang Jun Lee, Suwon-si (KR); Jung Won Choi, Goyang-si (KR); O Do Ryu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 527 days.

(21) Appl. No.: 12/588,454

(22) Filed: Oct. 15, 2009

(65) Prior Publication Data

US 2010/0154130 A1    Jun. 24, 2010

(30) Foreign Application Priority Data

Dec. 19, 2008  (KR) .................. 10-2008-0129826

(51) Int. Cl.
*D06F 29/00* (2006.01)
(52) U.S. Cl. ........................................ 68/23.1; 68/12.04

(58) Field of Classification Search .................. 68/12.04, 68/12.06, 23.1, 23.2, 23.3
See application file for complete search history.

(56) References Cited

FOREIGN PATENT DOCUMENTS

| DE | 29812393 U1 | * | 11/1999 |
| EP | 1243686 A1 | * | 9/2002 |
| JP | 6-31092 | | 2/1994 |
| WO | WO 2007031821 A1 | * | 3/2007 |

OTHER PUBLICATIONS

Extended European Search Report, mailed Sep. 16, 2010, in corresponding European Application No. 09172990.5 (4 pp.).

* cited by examiner

*Primary Examiner* — Michael Barr
*Assistant Examiner* — David Cormier
(74) *Attorney, Agent, or Firm* — Staas & Halsey LLP

(57) ABSTRACT

A damper including a cylinder, a piston inserted in the cylinder, a movable member disposed in the piston to be movable in the cylinder in a length direction of the cylinder, and a weight sensor mounted on an inner surface of the cylinder, facing an end of the piston, to perceive weight loaded on the piston through contact with the movable member. When applied to a washing machine, the damper is capable of perceiving accurate weight of the laundry supplied in the washing machine.

14 Claims, 11 Drawing Sheets

DAMPER, WASHING MACHINE WITH THE SAME AND CONTROL METHOD THEREOF

CROSS-REFERENCE TO RELATED APPLICATIONS

This application claims the benefit of Korean Patent Application No. 2008-0129826, filed on Dec. 19, 2008 in the Korean Intellectual Property Office, the disclosure of which is incorporated herein by reference.

BACKGROUND

1. Field

One or more embodiments relate to a damper capable of absorbing vibration of a tub generated during the operation of a washing machine, a washing machine with the same, and a control method of the washing machine.

2. Description of the Related Art

Generally, a drum-type washing machine comprises a tub that receives wash water and a drum that is rotatably mounted in the tub and receives laundry to be washed. The drum-type washing machine washes the laundry by rotating the drum such that the laundry is raised to the upper part of the drum and dropped in the rotating drum.

In a drum-type washing machine, the amount of laundry may be estimated according to the following principle. With respect to a reference time which is the time elapsed to accelerate rotation of the drum up to a predetermined speed, the accelerating time is increased if the laundry amount is large while the accelerating time is decreased if the laundry amount is small. Certain accelerating time and its corresponding amount of laundry are set as reference values based on the above principle. The laundry amount may thus be obtained by comparing the accelerating time currently measured with the reference time.

There is another method to estimate the amount of the laundry. When wash water is supplied in the drum containing the laundry, the laundry in the drum absorbs the wash water, thereby decreasing the water level of the initially supplied wash water. Therefore, the wash water needs to be resupplied to compensate the decrease, and the amount of laundry is determined by counting the number of times wash water is resupplied.

However, those methods are imperfect to accurately perceive the amount of laundry because of various materials and properties of the laundry. When the amount of laundry is incorrectly perceived, the washing efficiency would be deteriorated.

SUMMARY

Therefore, it is an aspect of one or more embodiments to provide a damper capable of perceiving weight of laundry loaded on a piston using a movable member mounted in the damper, a washing machine with the same, and a control method thereof.

In accordance with one aspect of one or more embodiments, a damper includes a cylinder, a piston inserted in the cylinder, a movable member disposed in the piston to be movable in the cylinder in a length direction of the cylinder, and a weight sensor mounted on an inner surface of the cylinder, facing an end of the piston, to perceive weight loaded on the piston through contact with the movable member.

The damper may further include a motor disposed in the piston, a pinion gear mounted to a shaft of the motor, and a rack gear mounted to the movable member and meshed with the pinion gear to enable the movable member to move in the length direction of the cylinder.

The movable member may include a guide groove formed on one side in the length direction of the cylinder, whereas the piston includes a guide rail engaged with the guide groove to guide movement of the movable member in the length direction of the cylinder.

The damper may further include a hydraulic device mounted in the piston to enable the movable member connected with a hydraulic piston to move in the length direction of the cylinder.

The hydraulic device may include a hydraulic cylinder disposed in the piston, thereby constituting the exterior of the hydraulic device, and the hydraulic piston, wherein the hydraulic piston is disposed at an inner space of the hydraulic cylinder.

The hydraulic cylinder may include first and second chambers partitioned by the hydraulic piston, and the movable member is movable along the length of the cylinder by hydraulic oil supplied into the first and the second chambers.

The movable member may be moved toward the weight sensor and brought into contact with the weight sensor when the hydraulic oil is supplied to the first chamber. The movable member may be moved to be separated and distanced from the weight sensor when the hydraulic oil is supplied to the second chamber.

In accordance with another aspect of one or more embodiments, a washing machine equipped with a damper includes a cylinder and a piston inserted in the cylinder, the washing machine including a movable member disposed in the piston to be movable in the cylinder in a length direction of the cylinder, a weight sensor mounted on an inner surface of the cylinder, facing an end of the piston, to perceive weight loaded on the piston through contact with the movable member, and a control unit moving the movable member into contact with the weight sensor when it is required to perceive laundry weight.

The control unit may control the movable member to move by an initial distance value corresponding to when there is no laundry supplied.

Perception of the laundry weight may be required upon opening of a door of the washing machine.

The control unit may move the movable member so that the movable member is distanced from the weight sensor when the door is closed.

Perception of the laundry weight may be required upon input of a washing operation command.

The control unit may move the movable member so that the movable member is distanced from the weight sensor after perception of the laundry weight is completed.

In accordance with a further aspect of one or more embodiments, in a washing machine with a damper which includes a cylinder and a piston inserted in the cylinder, a control method of the washing machine includes determining whether perception of laundry weight is required, moving a movable member into contact with a weight sensor when perception of the laundry weight is required, the movable member moving in the cylinder in a length direction of the cylinder, and perceiving the laundry weight loaded on the piston through contact between the piston and the weight sensor.

The movable member may be moved by an initial distance value corresponding to when there is no laundry supplied.

Perception of the laundry weight may be required upon opening of a door of the washing machine.

The control method may further include detecting whether the door is closed, and moving the movable member so that the movable member is distanced from the weight sensor when the door is closed.

Perception of the laundry weight may be required upon input of a washing operation command.

The control method may further include determining whether perception of the laundry weight is completed, and moving the movable member so that the movable member is distanced from the weight sensor upon perception of the laundry weight being completed.

One or more embodiments may further include a method of determining a weight of laundry in a washing machine with a damper which includes a piston with a movable member, the method including moving the movable member into contact with a weight sensor, the movable member moving in a direction toward the weight sensor, and perceiving the laundry weight loaded on the piston through contact between the movable member and the weight sensor, before performing a washing.

The perceiving of the laundry weight may be through one of force resistance sensing, acceleration sensing, and load sensing.

The method may further comprise moving the movable member back to an initial position after perceiving the laundry weight and before performing a washing.

The laundry weight may be determined to be a last weight perceived before a door of the washing machine is detected to be closed.

The perceived laundry weight may be stored in a storage unit.

As described above, the damper, the washing machine with the same, and the control method thereof in accordance with one or more embodiments are capable of measuring weight of the laundry accurately by perceiving the laundry weight loaded on a piston using a movable member mounted in the damper. Accordingly, economical use of wash water and uniform cleaning effect may be guaranteed.

Furthermore, as the weight of the laundry is accurately perceived, patterns of the washing operation, such as the amount of wash water to be supplied and the washing time, may be properly set. Accordingly, the washing efficiency may be enhanced.

In addition, the high washing efficiency consequently improves reliability in use of the washing machine.

Additional aspects and/or advantages will be set forth in part in the description which follows and, in part, will be apparent from the description, or may be learned by practice of one or more embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
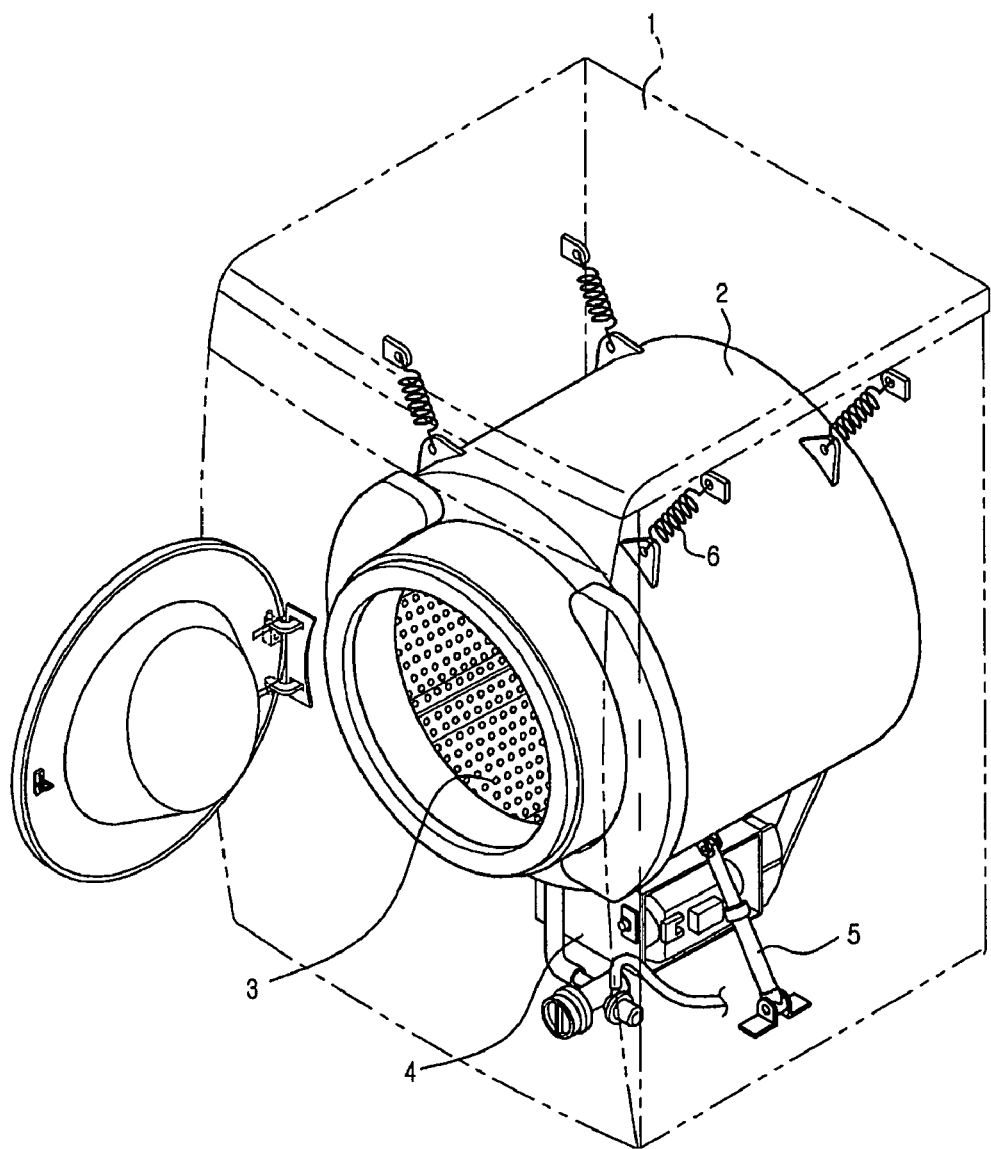
FIG. 1 illustrates a perspective view of a drum-type washing machine according to an embodiment.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a perspective view of a drum-type washing machine according to an embodiment.

Referring to FIG. 1, the drum-type washing machine comprises a cabinet 1 constituting the exterior thereof, a cylindrical tub 2 mounted within the cabinet 1, and a drum 3 rotatably mounted in the tub 2. Additionally, a driving motor 4 is mounted at a rear lower part of the cabinet 1 to rotate the drum 3.

In the above-structured drum-type washing machine, additionally, a damper 5 is connected between a lower part of the cabinet 1 and a lower part of the tub 2, and a suspension spring 6 is connected to an upper part of the cabinet 1 and the tub 2.

Figure 2:
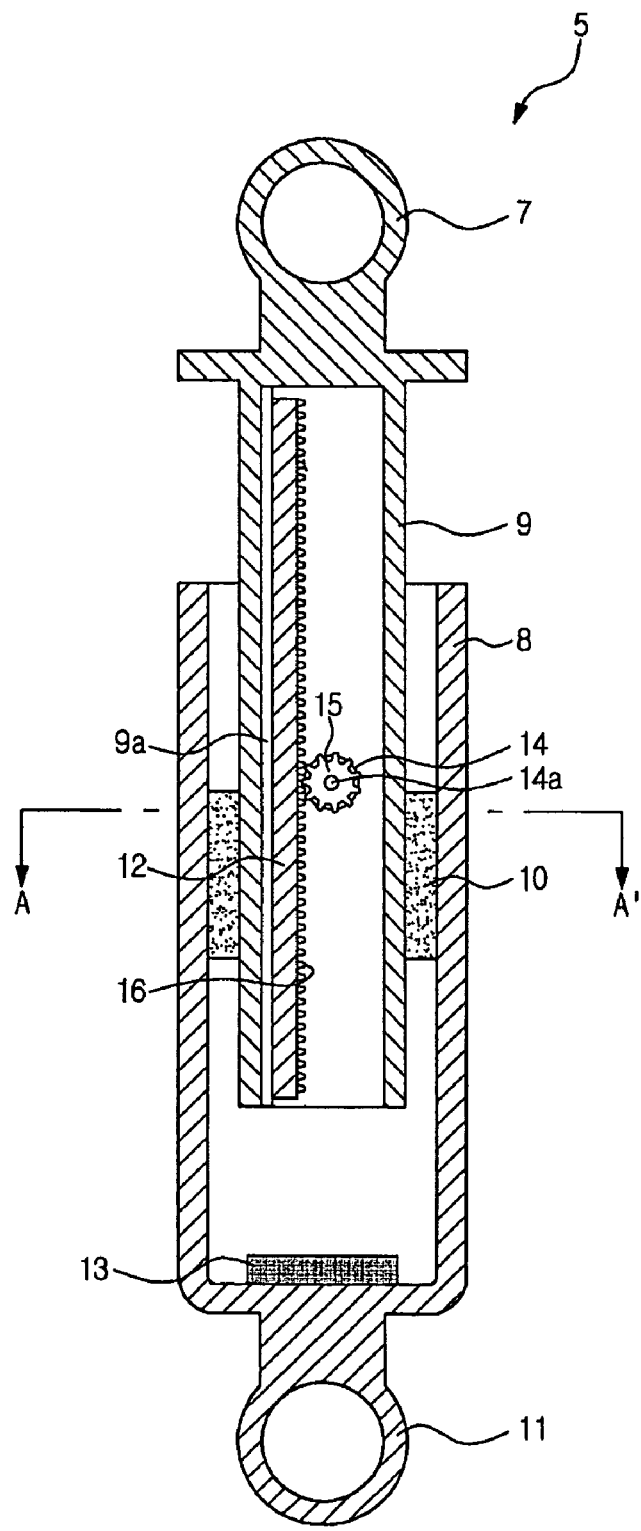
FIG. 2 illustrates a sectional view of a damper according to the embodiment.
Figure 3:
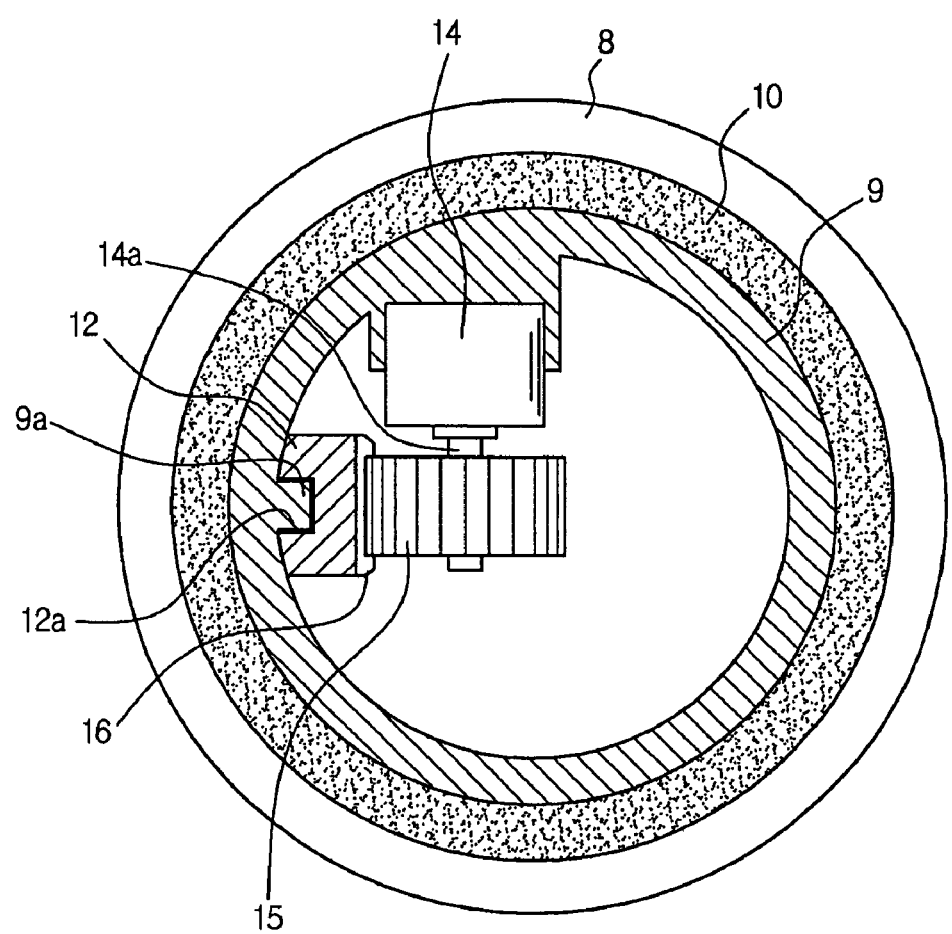
FIG. 3 illustrates a sectional view of FIG. 2, cut along a line B-B'.

FIG. 2 is a sectional view of the damper 5 according to the embodiment, and FIG. 3 is a sectional view of FIG. 2 along a line A-A'.

Referring to FIGS. 2 and 3, the damper 5 comprises a first connection ring 7 connected with the lower part of the tub 2, a cylinder 8 extended from the first connection ring 7, a piston 9 inserted in the cylinder 8, a friction member 10 in close contact with the piston 9, and a second connection ring 11 connected with the lower part of the cabinet 1.

Furthermore, the damper 5 also comprises a movable member 12 disposed in the piston 9 so as to move within the cylinder 8 in a length direction of the cylinder 8, and a weight sensor 13 mounted on an inner surface of the cylinder 8, facing an end of the piston 9, to perceive weight loaded on the piston 9 through contact with the movable member 12.

A motor 14 is mounted in the piston 9 to enable the movable member 12 to move in the length direction of the cylinder 8, that is, a vertical direction in FIG. 2. The motor 14 generates a driving force by rotating a motor shaft 14a forward and backward.

A pinion gear 15 is mounted to the motor shaft 14a to receive the driving force from the motor 14. A rack gear 16 is mounted to the movable member 12 and meshed with the pinion gear 15 to receive a rotating force of the pinion gear 15, thereby enabling the movable member 12 to move in the length direction of the cylinder 8.

The movable member 12 includes a guide groove 12a formed on one surface thereof in the length direction of the cylinder 8. Correspondingly, the piston 9 includes a guide rail 9a engaged with the guide groove 12a to guide the movement of the movable member 12 in the length direction of the cylinder 8.

As the guide rail 9a of the piston 9 is engaged with the guide groove 12a of the movable member 12, the movable member 12 is able to stably move along the length of the cylinder 8 without shaking. Furthermore, the weight loaded on the piston 9 may be transmitted stably to the movable member 12.

The friction member 10 is mounted on the inner surface of the cylinder 8 to be in close contact with the piston 9. The friction member 10 may have an annular form.

The weight sensor 13 perceives the weight loaded on the piston 9 through contact with the movable member 12. A force sensing resistor (FSR) sensor, an acceleration sensor, a load sensor and the like may be used for the weight sensor 13.

The FSR sensor measures a dynamic force using variation of resistance caused by a force or pressure applied to a surface thereof.

The acceleration sensor measures a physical quantity of variation of speed by directly perceiving acceleration which means variation of dynamic vibration of a motional body.

The load sensor is sort of a transducer that converts a certain force or load into electric signals and thereby measures the force or load. More specifically, when physical transformation occurs at a sensor of an elastic strain member which generates structurally stable transformation with regard to a force or load, a strain gauge converts the physical transformation into variation of electric resistance. In addition, a 'Wheatstone Bridge' circuit converts the variation of electric resistance into minute electric signals.

Hereinafter, the operational principle of the above-structured damper according to one or more embodiments will be explained.

Figure 4A:
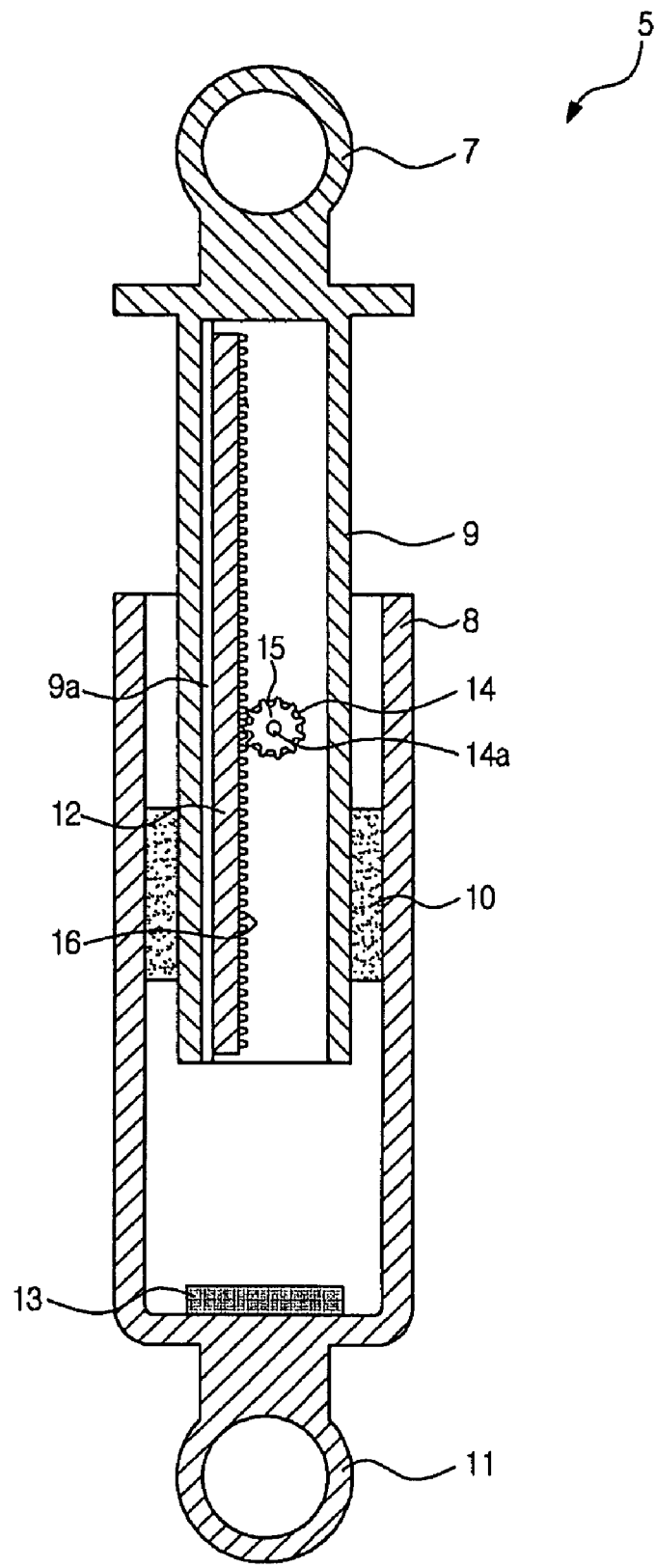
FIG. 4A and FIG. 4B are views explaining the operation principle of the damper according to the embodiment.
Figure 4B:
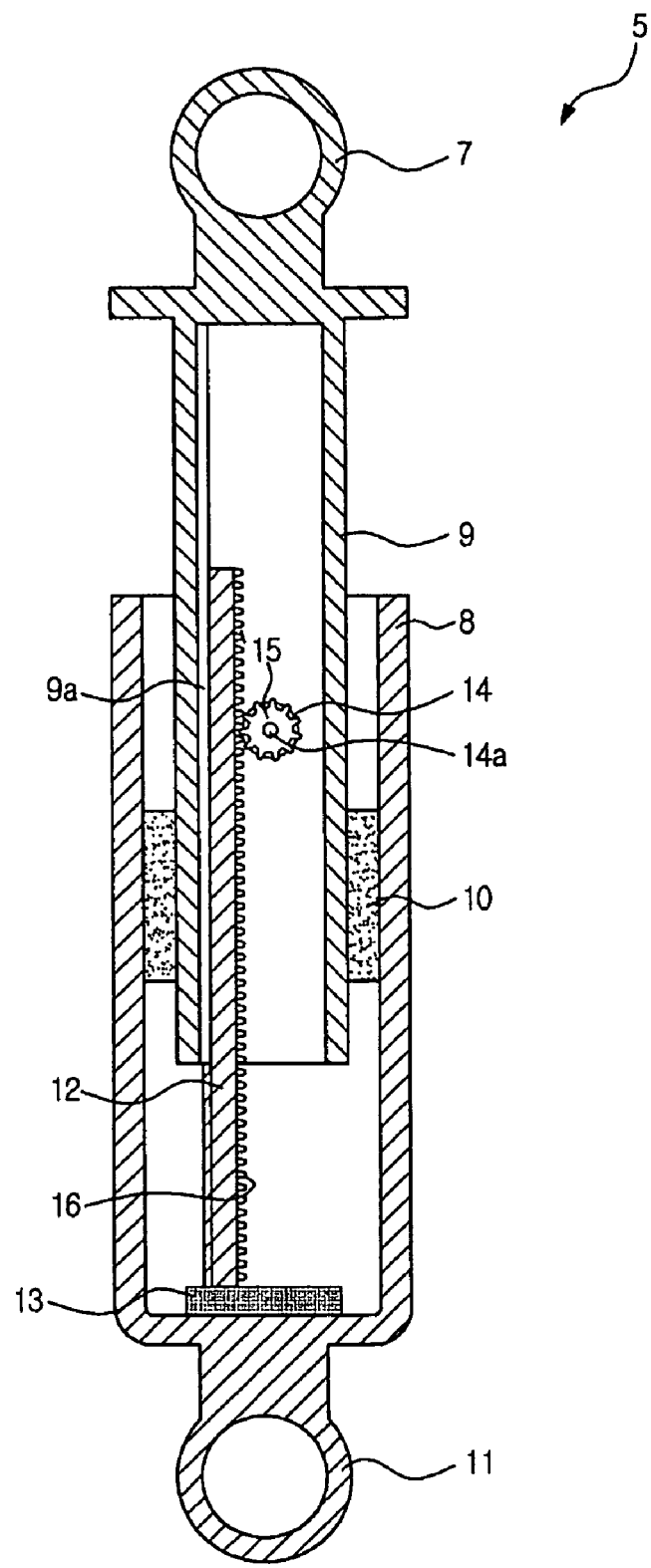

FIG. 4A and FIG. 4B are views to explain the operational principle of the damper 5 according to one or more embodiments. Referring to FIG. 4A, as the motor 14 rotates and thereby generates a driving force, the driving force of the motor 14 is transmitted through the motor shaft 14a to the pinion gear 15. The pinion gear 15 is accordingly rotated and transmits the rotational motion to the rack gear 16 in mesh with the pinion gear 15.

Therefore, the rack gear 16 converts the rotational motion of the pinion gear 15 to a linear motion, thereby moving down the movable member 12 connected with the rack gear 16 until the movable member 12 is brought into contact with the weight sensor 13 as shown in FIG. 4B. Here, since the guide rail 9a of the piston 9 is in engagement with the guide groove 12a (FIG. 3) of the movable member 12, the movement of the movable member 12 may be efficiently achieved.

Next, through the contact with the movable member 12, the weight sensor 13 perceives weight loaded on the piston 9.

On the other hand, if it is intended to move the movable member 12 upward, the motor 14 is rotated in the opposite direction to the previous direction such that the pinion gear 15 is rotated also in the opposite direction. Accordingly, the rack gear 16 meshed with the pinion gear 15 performs a linear motion in the opposite direction, thereby moving the movable member 12 upward so that the movable member 12 is distanced from the weight sensor 13.

Figure 5:
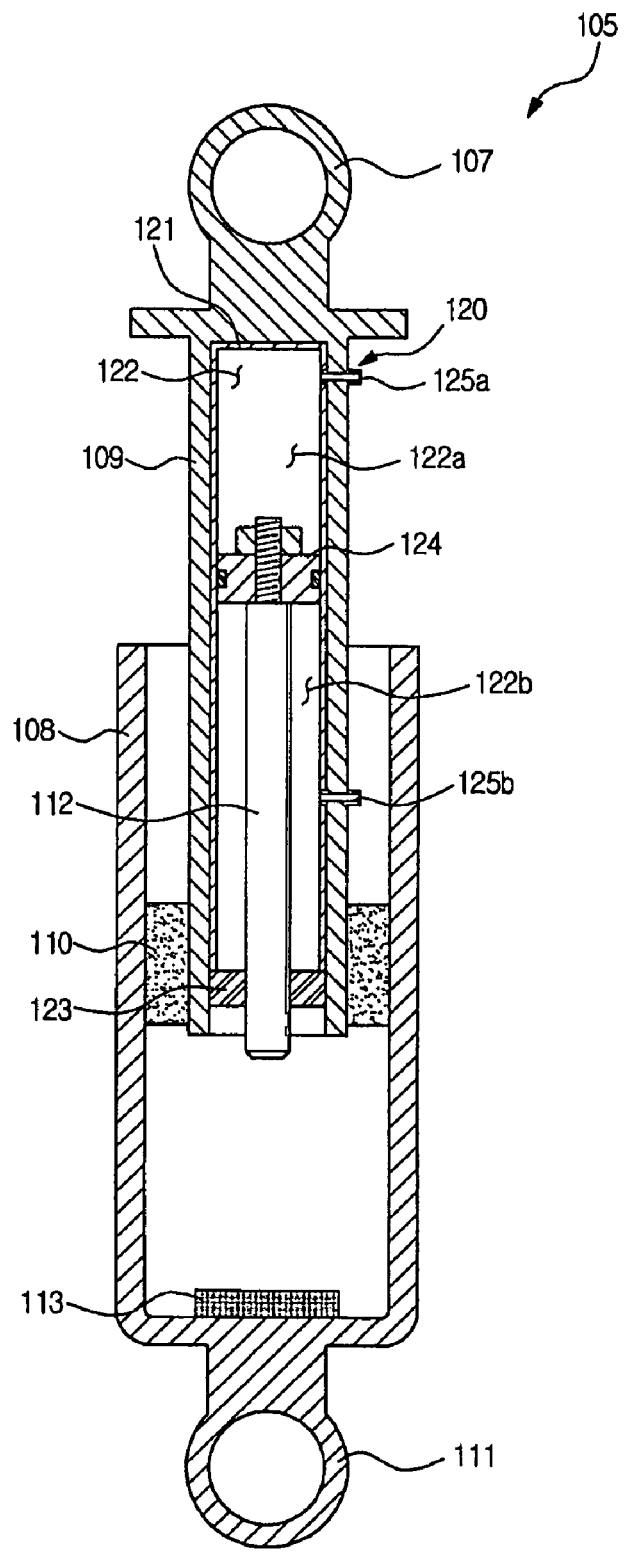
FIG. 5 illustrates a sectional view showing a damper according to another embodiment.

FIG. 5 is a sectional view of a damper 105 according to another embodiment.

The damper 105 according to another embodiment shown in FIG. 5 comprises the first connection ring 107 connected to the lower part of the tub 2 (FIG. 1), the cylinder 108 extended from the first connection ring 107, the piston 109 inserted in the cylinder 108, the friction member 110 disposed in the cylinder 108 to be in close contact with the piston 109, and the second connection ring 111 connected to the lower part of the cabinet 1 (FIG. 1).

The damper 105 further comprises a movable member 112 disposed in the piston 109 so as to move within the cylinder 108 in a length direction of the cylinder 108, and a weight sensor 113 mounted on an inner surface of the cylinder 108, facing an end of the piston 109, to perceive weight loaded on the piston 109 through contact with the movable member 112.

Additionally, a hydraulic device 120 is further provided in the piston 109 to move the movable member 112 in the length direction of the cylinder 108.

The hydraulic device 120 includes a hydraulic cylinder 121 disposed in the piston 109 while constituting the exterior thereof. An inner space 122 of the hydraulic cylinder 120 is sealed by a cover 123.

The hydraulic device 120 further includes a hydraulic piston 124 connected to the movable member 112, being disposed in the inner space 122 of the hydraulic cylinder 121. Considering that the hydraulic piston 124 frictionally contacts an inner wall of the hydraulic cylinder 121, the hydraulic piston 124 may be formed of a softer material than the hydraulic cylinder 121 so as not to cause a scratch on the inner wall of the inner space 122 during the frictional contact.

The hydraulic cylinder 121 further comprises a first chamber 122a and a second chamber 122b partitioned by the hydraulic piston 124. The movable member 112 may be moved in the length direction of the cylinder 108 by hydraulic oil supplied to the first and the second chambers 122a and 122b.

As the hydraulic oil is supplied into the first chamber 122a through a first path 125a, pressure of the hydraulic oil is applied to the hydraulic piston 124 in a direction from the upper part to the lower part of the hydraulic piston 124 in FIG. 5. Accordingly, the hydraulic piston 124 is moved toward the weight sensor 113. The movable member 112 connected to the hydraulic piston 124 is also moved to the weight sensor 113 and brought into contact with the weight sensor 113.

On the other hand, when the hydraulic oil is supplied to the second chamber 122b through a second path 125b, pressure of the hydraulic oil is applied to the hydraulic piston 124 in the opposite direction as before, that is, from the lower part to the upper part of the hydraulic piston 124 in FIG. 5. Therefore, the hydraulic piston 124 is moved in a distancing direction from the weight sensor 113. The movable member 112 is also moved in a direction to be separated from the weight sensor 113.

The friction member 110 is mounted on the inner surface of the cylinder 108 to be in close contact with the piston 109. The friction member 110 may have an annular form.

The weight sensor 113 perceives the weight loaded on the piston through contact with the movable member 112. An FSR sensor, an acceleration sensor, a load sensor and the like may be used for the weight sensor 113.

Hereinafter, the operation principle of the damper according to another embodiment will be explained.

Figure 6A:
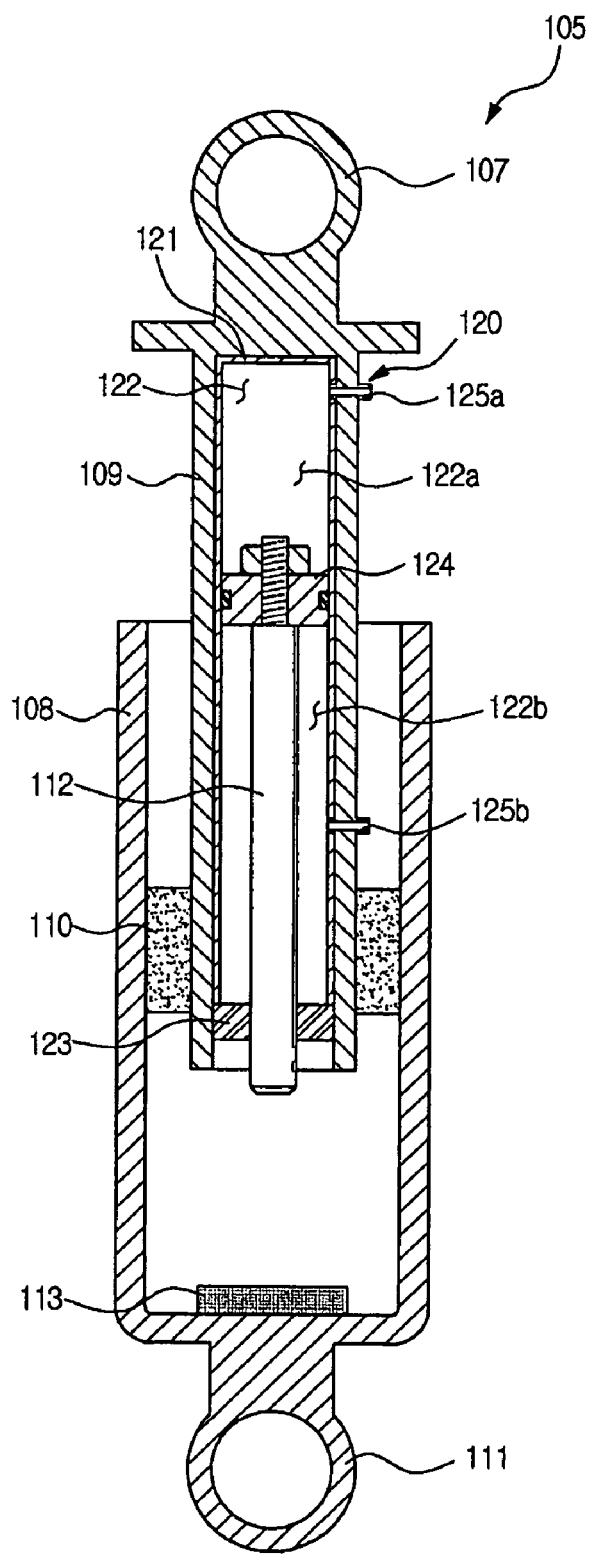
FIG. 6A and FIG. 6B illustrates views explaining the operation principle of the damper according to another embodiment.
Figure 6B:
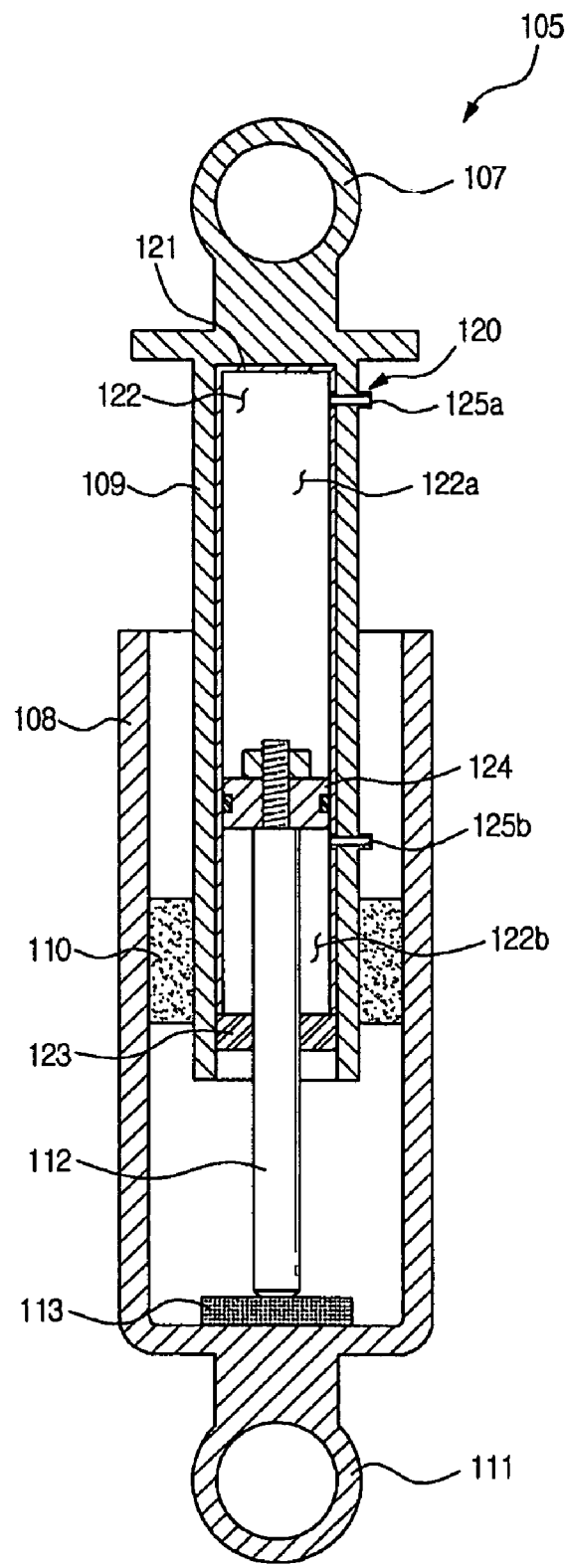

FIG. 6A and FIG. 6B are views explaining the operation principle of the damper 105 according to another embodiment. In FIG. 6A, when hydraulic oil is supplied to the first chamber 122a through the first path 125a, the hydraulic oil flowing into the first chamber 122a applies pressure to the hydraulic piston 124. Such pressure enables the hydraulic piston 124 to move backward, that is, upward with respect to FIG. 6A, overcoming the friction and other external forces. Accordingly, the movable member 112 may be moved upward and separated from the weight sensor 113.

Figure 7:
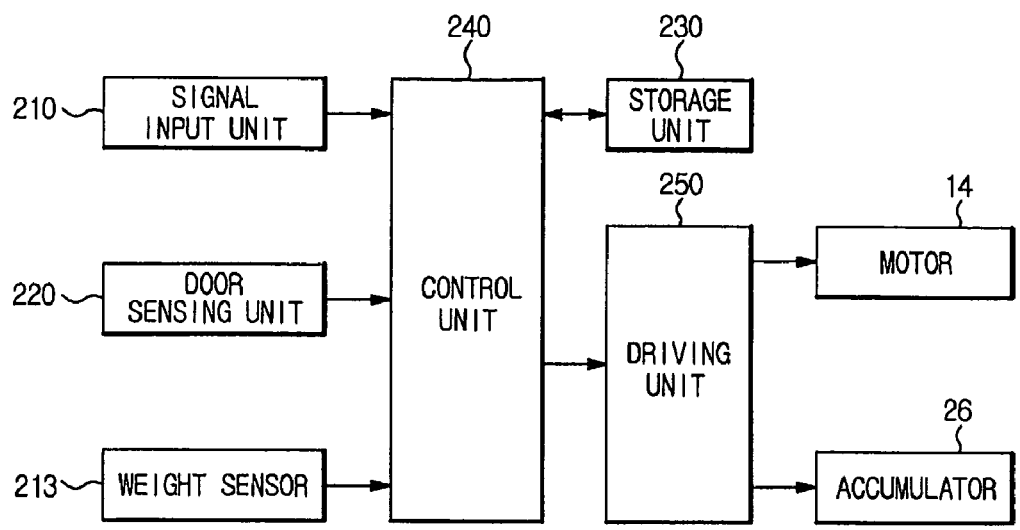
FIG. 7 illustrates a control block diagram of the washing machine equipped with the damper according to the embodiment.

FIG. 7 is a control block diagram of a washing machine with the damper according to one or more embodiments.

Referring to FIG. 7, the washing machine comprises a signal input unit 210, a door sensing unit 220, a weight sensor 213 (for example, the weight sensor 13 (FIG. 2) or the weight sensor 113 (FIG. 5), a storage unit 230, a control unit 240 and a driving unit 250.

Various operational information and commands including a washing course, washing temperature, rpm for a dehydration course, an additional rinsing course and the like determined according to materials of the laundry are input to the control unit 240 through the signal input unit 210.

The door sensing unit 220 detects an opened state of a door of the washing machine to supply the laundry into the drum 3 (FIG. 1), and also detects a closed state of the door.

The weight sensor 213 perceives weight of the laundry loaded on the piston 9 (FIG. 2) or piston 109 (FIG. 5) through contact with the movable member 12 (FIG. 2) or movable member 112 (FIG. 5). The weight sensor 213 may comprise an FSR sensor, an acceleration sensor, a load sensor and so on.

The storage unit 230 stores information on the washing machine, including the operation algorithm and the number of washing courses to be performed.

Furthermore, the storage unit 230 stores the laundry weight perceived by the weight sensor 213. To this end, the storage unit 230 comprises storage media capable of storing the information on the washing machine, such as a dynamic random access memory (DRAM), a synchronous DRAM (SDRAM), a Rambus DRAM (RDRAM), a double data rate DRAM (DDRAM), and a static RAM (SRAM).

The control unit 240 comprises a microcomputer which controls the washing machine in accordance with the operational information input through the signal input unit 210. The control unit 240 determines whether it is required to perceive the weight of the laundry. In other words, the control unit 240 determines whether the door sensing unit 220 detects the opened state of the door of the washing machine or whether a washing operation command is input through the signal input unit 210. If the opened state of the door is detected or the washing operation command is input, the control unit 240 performs processes to perceive the weight of the laundry supplied into the drum 3 (FIG. 1).

Therefore, the control unit 140 operates the movable member 12 (FIG. 2) or movable member 112 (FIG. 5) to move into contact with the weight sensor 213. Here, the control unit 240 controls the movable member 12 (FIG. 1) or movable member 112 (FIG. 5) to move by an initial distance value corresponding to when there is no laundry supplied.

More specifically, the control unit 240 controls the movable member 12 (FIG. 1) to move by a distance from its current position to a position to contact the weight sensor 213, in order to perceive the weight of the laundry.

The movement of the movable member 12 (FIG. 1) performed to perceive the laundry weight will be more specifically explained. When the control unit 240 outputs a driving control signal to the driving unit 250, the motor 14 drives, thereby generating a rotational force, and the pinion gear 15 (FIG. 2) is rotated by the rotational force of the motor 14.

Referring to FIGS. 2 and 7, the movable member 12 is brought into contact with the weight sensor 13 by the rack gear 16 linearly moving in engagement with the pinion gear 15. When the movable member 12 contacts the weight sensor 213 (for example, weight sensor 13 in FIG. 2), the weight sensor 213 perceives the laundry weight loaded on the piston 9 through contact with the movable member 12, and inputs the perceived weight value to the control unit 240.

Referring to FIGS. 5 and 7, the movable member 112 to perceive the laundry weight may be operated the following manner. When the control unit 240 outputs the driving control signal to the driving unit 250, the hydraulic oil stored in an accumulator 26 is supplied to the first chamber 122*a* through the first path 125*a*. The hydraulic oil applies pressure to the hydraulic piston 124, and the hydraulic piston 124 overcomes external forces and friction by help of the pressure. Therefore, the hydraulic piston 124 moves forward, that is, downward with respect to FIG. 6B.

Accordingly, the movable member 112 in contact with the hydraulic piston 124 is moved down, thereby being brought into contact with the weight sensor 213 (for example, weight sensor 113 in FIG. 5). The weight sensor 213 perceives the laundry weight loaded on the piston 109 through contact with the movable member 112 and inputs the perceived weight to the control unit 240.

Referring again to FIG. 7, the control unit 240 stores the laundry weight in real time. More particularly, the control unit 240 perceives the laundry weight at every predetermined period from when the opened state of the door is detected to when the closed state of the door is detected, and stores the perceived laundry weight in the storage unit 230.

In addition, when the door sensing unit 220 detects a closed state of the door of the washing machine, the storage unit 240 determines the weight stored last among the stored weights as the weight of the laundry.

When the door sensing unit 220 detects the closed state of the door, the control unit 240 determines that supply of the laundry is completed, and may input a driving control signal to the driving unit 250 to move the movable member 12 (FIG. 2) to the initial position.

That is, the control unit 240 may control the movable member 12 (FIG. 2) of the damper 5 (FIG. 2) to move into contact with the weight sensor 213 so that the laundry weight is perceived when it is required to perceive the laundry weight. After the laundry weight is perceived, the control unit 240 may control the movable member 12 (FIG. 2) to return to its initial position, so that the damper 5 (FIG. 2) absorbs vibration of the tub 2 (FIG. 1) generated during the operation of the washing machine, which is the basic function of the damper 5 (FIG. 2).

The control unit 240 performs the washing operation in accordance with the weight information stored in the storage unit 230 and the operational information input through the signal input unit 210 by the user.

The driving unit 250 may drive the motor 14 of the damper 5 (FIG. 2) or the accumulator 26 of the damper 105, according to the driving control signal of the control unit 240.

Figure 8:
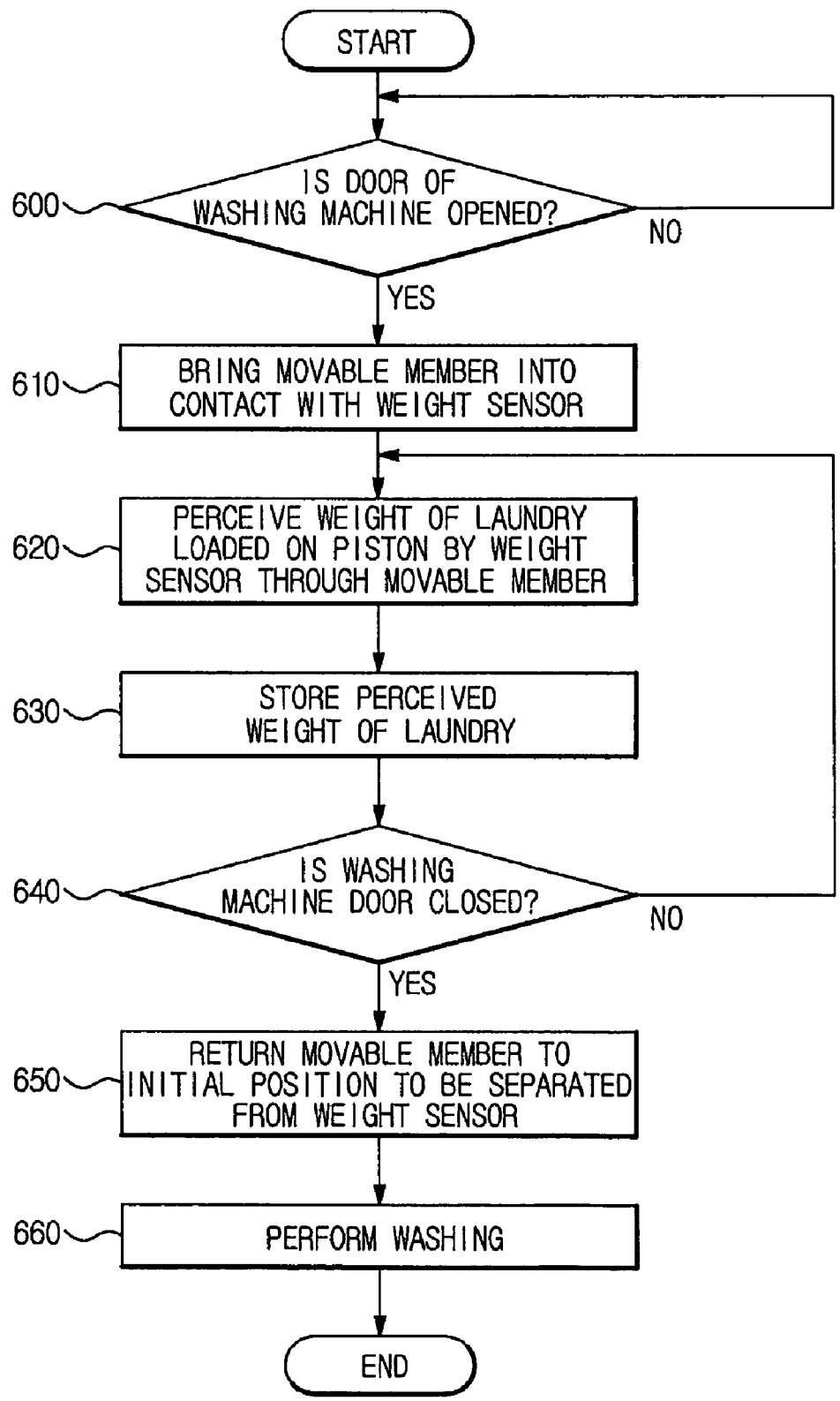
FIG. 8 illustrates an operation flowchart illustrating processes for controlling the washing machine with the damper according to the embodiment.

FIG. 8 illustrates an operation flowchart illustrating processes for controlling the washing machine with the damper according to one or more embodiments.

Referring to FIGS. 7 and 8, the door sensor 220 may detect whether the door of the washing machine is opened 600.

If the door is detected to have been opened, the control unit 240 performs the processes to perceive weight of the laundry supplied into the drum 3 (FIG. 1). If the door is detected not to be open, then the door sensor 220 continues to detect whether the door is opened.

That is, if the door is detected to have been opened, the control unit 240 moves the movable member 12 (FIG. 2), or movable member 112 (FIG. 5) so that the movable member 12 (FIG. 2), or movable member 112 (FIG. 5) contacts the weight sensor 213. Here, the movable member 12 (FIG. 2), or movable member 112 (FIG. 5) is moved by the initial distance value corresponding to when there is no laundry supplied.

More particularly, the control unit 240 controls the movable member 12 (FIG. 2), or movable member 112 (FIG. 5) to move by the distance from its current position to the position to contact the weight sensor 213, in order to perceive the weight of the laundry.

When the control unit 240 outputs the driving control signal to the driving unit 250 to perceive the laundry weight, the motor 14 generates a rotational force, and the pinion gear 15 (FIG. 2) is rotated by the rotational force of the motor 14.

Therefore, considering damper 5 of FIG. 2, the movable member 12 is brought into contact with the weight sensor 213 by the rack gear 16 linearly moving in engagement with the pinion gear 15. When the movable member 12 contacts the weight sensor 213 in operation 610, the weight sensor 213 perceives the laundry weight loaded on the piston 9 through contact with the movable member 12 in operation 620, and inputs the perceived weight value to the control unit 240.

On the other hand, considering damper 105 of FIG. 5, when the control unit 240 outputs the driving control signal to the driving unit 250, the hydraulic oil stored in an accumulator 26 is supplied to the first chamber 122a through the first path 125a and applies pressure to the hydraulic piston 124. Accordingly, the hydraulic piston 124 overcomes external forces and friction by help of the pressure and thereby moves forward, that is, downward with respect to FIG. 6B.

Accordingly, the movable member 112 in contact with the hydraulic piston 124 is moved downward and brought into contact with the weight sensor 213. The weight sensor 213 perceives the laundry weight loaded on the piston 109 through contact with the movable member 112 in operation 620, and inputs the perceived weight to the control unit 240.

After operation 620, the control unit 240 stores the perceived laundry weight in the storage unit 230 in operation 630.

Next, the door sensor 220 detects whether the door is closed in operation 640. If the closed state of the door is detected, it is determined that supply of the laundry is completed. Accordingly, the movable member 12 (FIG. 2) or the movable member 112 (FIG. 5) is returned to the initial position to be separated from the weight sensor 230 in operation 650. If the closed state of the door is not detected, then the weight sensor 213 continues to perceive the laundry weight.

Next, the control unit 240 performs the washing operation in accordance with the weight information stored in the storage unit 230 and the operational information input through the signal input unit 210 by the user in operation 660.

Figure 9:
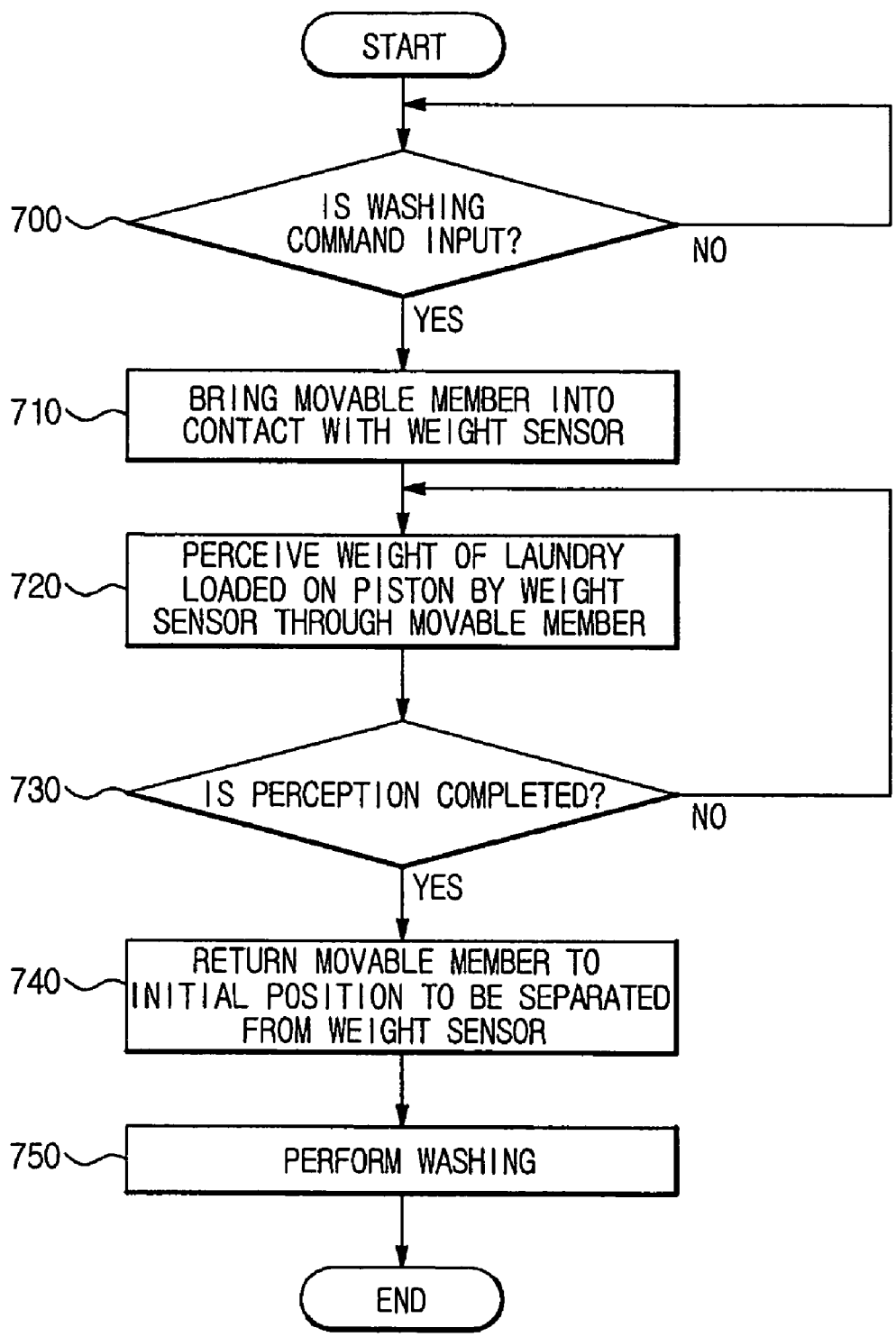
FIG. 9 illustrates an operation flowchart illustrating processes for controlling the washing machine with the damper according to another embodiment.

FIG. 9 is an operation flowchart illustrating the processes to control the washing machine with the damper according to another embodiment.

Referring to FIGS. 7 and 9, the control unit 240 determines whether the washing operation command is input through the signal input unit 210 in operation 700.

If the command is input, the control unit 240 performs the processes to perceive weight of the laundry supplied into the drum 3 (FIG. 1). If the command is not input, the signal input unit 210 continues to wait for a command to be input.

Considering the damper 5 of FIG. 2, when the control unit 240 outputs the driving control signal to the driving unit 250, the motor 14 generates a rotational force, and the pinion gear 15 (FIG. 2) is rotated by the rotational force of the motor 14.

Therefore, the movable member 12 (FIG. 2) is brought into contact with the weight sensor 213 by the rack gear 16 (FIG. 2) linearly moving in engagement with the pinion gear 15 (FIG. 2). When the movable member 12 (FIG. 2) contacts the weight sensor 213 in operation 710, the weight sensor 213 perceives the laundry weight loaded on the piston 9 (FIG. 2) through contact with the movable member 12 (FIG. 2) in operation 720, and inputs the perceived weight value to the control unit 240.

Considering the damper 105 of FIG. 5, when the control unit 240 outputs the driving control signal to the driving unit 250, the hydraulic oil is supplied to the first chamber 22a (FIG. 5) through the first path 25a (FIG. 5) and applies pressure to the hydraulic piston 24 (FIG. 5). Accordingly, the hydraulic piston 24 (FIG. 5) overcomes external forces and friction by help of the pressure and thereby moves forward, that is, downward with respect to FIG. 6B.

Then, the movable member 112 (FIG. 5) in contact with the hydraulic piston 24 (FIG. 5) is moved downward and brought into contact with the weight sensor 213. The weight sensor 213 perceives the laundry weight loaded on the piston 109 (FIG. 5) through contact with the movable member 112 (FIG. 5) and inputs the perceived weight to the control unit 240.

It is determined whether perception of the laundry weight is completed in operation 730. When the perception is completed, the movable member 12 (FIG. 2) or movable member 112 (FIG. 5) is moved to the initial position to be separated from the weight sensor 213 operation 740. If the perception is not completed, the weight sensor 213 continues to perceive the laundry weight.

Next, the control unit 240 performs the washing operation in accordance with the weight information stored in the storage unit 230 and the operational information input through the signal input unit 210 by the user in operation 750.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A damper comprising:
    a cylinder;
    a piston inserted in the cylinder;
    a movable member disposed in the piston to be movable in the cylinder in a length direction of the cylinder; and
    a weight sensor mounted on an inner surface of the cylinder, facing an end of the piston, to perceive weight loaded on the piston through contact with the movable member.

2. The damper according to claim 1, further comprising:
    a motor disposed in the piston;
    a pinion gear mounted to a shaft of the motor; and
    a rack gear mounted to the movable member and meshed with the pinion gear to enable the movable member to move in the length direction of the cylinder.

3. The damper according to claim 1, wherein the movable member includes a guide groove formed on one side in the length direction of the cylinder, whereas the piston includes a guide rail engaged with the guide groove to guide movement of the movable member in the length direction of the cylinder.

4. The damper according to claim 1, further comprising a hydraulic device mounted in the piston to enable the movable member connected with a hydraulic piston to move in the length direction of the cylinder.

5. The damper according to claim 4, wherein the hydraulic device comprises:
    a hydraulic cylinder disposed in the piston, thereby constituting an exterior of the hydraulic device; and
    the hydraulic piston,
    wherein the hydraulic piston is disposed at an inner space of the hydraulic cylinder.

6. The damper according to claim 5, wherein the hydraulic cylinder comprises first and second chambers partitioned by the hydraulic piston, and
    the movable member is movable along the length of the cylinder by hydraulic oil supplied into the first and the second chambers.

7. The damper according to claim 6, wherein the movable member is moved toward the weight sensor and brought into contact with the weight sensor when the hydraulic oil is supplied to the first chamber.

8. The damper according to claim 6, wherein the movable member is moved to be separated and distanced from the weight sensor when the hydraulic oil is supplied to the second chamber.

9. A washing machine equipped with a damper including a cylinder and a piston inserted in the cylinder, the washing machine comprising:
   a movable member disposed in the piston to be movable in the cylinder in a length direction of the cylinder;
   a weight sensor mounted on an inner surface of the cylinder, facing an end of the piston, to perceive weight loaded on the piston through contact with the movable member; and
   a control unit moving the movable member into contact with the weight sensor when it is required to perceive laundry weight.

10. The washing machine according to claim 9, wherein the control unit controls the movable member to move by an initial distance value corresponding to when there is no laundry supplied.

11. The washing machine according to claim 9, wherein perception of the laundry weight is required upon opening of a door of the washing machine.

12. The washing machine according to claim 11, wherein the control unit moves the movable member so that the movable member is distanced from the weight sensor when the door is closed.

13. The washing machine according to claim 9, wherein perception of the laundry weight is required upon input of a washing operation command.

14. The washing machine according to claim 13, wherein the control unit moves the movable member so that the movable member is distanced from the weight sensor after perception of the laundry weight is completed.

* * * * *